United States Patent Office 2,947,772
Patented Aug. 2, 1960

2,947,772

ALKOXYSILANES AND THEIR USE AS LUBRICANTS

Benjamin A. Eynon and Harry M. Schiefer, Midland, Mich., assignors to Dow Corning Corporation, Midland, Mich., a corporation of Michigan No Drawing. Filed Nov. 10, 1958, Ser. No. 772,731

7 Claims. (Cl. 260—448.8)

The present invention relates to novel higher alkyl higher alkoxysilanes and the corresponding disiloxanes.

It has long been known that organosilioxanes, commonly known as silicones, are useful as lubricants primarily because of the thermal stability, oxidation resistance and relatively little change in consistency with temperature. However, the organosiloxanes in general suffer from the disadvantage that they are relatively poor lubricants with respect to steel on steel. Since an overwhelming majority of lubrication problems involve steel on steel surfaces this defect limits the use of organosiloxanes to a relatively small proportion of the lubrication market. As a result siloxanes are generally employed to lubricate surfaces other than steel on steel or they are employed to lubricate steel surfaces operating at temperatures above or below that at which other lubricants are operative.

A considerable improvement in the lubricity of siloxanes is obtained by using siloxanes having halogenated hydrocarbon groups, particularly halogenated phenyl groups attached to the silicon. However, the improvement is not as great as is desired for many applications.

Attempts have been made to remedy the lubrication deficiencies of organosiloxanes for steel by employing organic orthosilicates and polysilicates. Some utility is to be found in these materials. However, they suffer from certain inherent disadvantages, namely, limited oxidation stability, hydrolytic stability and marginal lubricating properties.

Other attempts have been made to improve the lubricity of organosilicon compounds by employing tetraalkylsilanes. However, these materials suffer from the disadvantages of having rapid change in viscosity with temperature which is highly objectionable for lubrication use. Applicants have found unexpectedly that one can obtain excellent lubricity coupled with good temperature-viscosity relationships, good oxidation and hydrolytic stability by employing the alkylalkoxysilanes and siloxanes defined below.

It is the object of this invention to provide novel compositions of matter which give improved lubricity and improved performance over heretofore known organosilicon lubricants. Another object is to provide materials which are suitable for use as hydraulic fluids in automotive vehicles. Other objects and advantages will be apparent from the following description.

This invention relates to silanes of the formula

RSi(OR')₃ 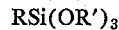

and to siloxanes of the formula [R(R'O)₂Si]₂O in which R is an alkyl group of from 8 to 20 carbon atoms inclusive and R' is a branched chain alkyl group of 4 to 20 carbons inclusive in which the branching occurs at the carbon atom beta to the oxygen, in said silane the total number of carbon atoms being from 30 to 50 inclusive per molecule and in said siloxanes the total number of carbon atoms being from 32 to 70 inclusive per molecule.

As can be seen the R groups on the silanes and siloxanes of this invention can be any alkyl group having the defined number of carbon atoms such as octyl, isoactyl, secondary decyl, tertiary octyl, dodecyl, pentadecyl, octadecyl and eicosyl. Thus, it can be seen that the alkyl groups attached to the silicon can be either linear or branched chain.

The R' groups employed in this invention are branched chain alkyl groups in which the branching occurs on the carbon atom beta to the oxygen. Thus, examples of R' radicals which are operative herein are isobutyl, 2-ethylbutyl, 2-methylbutyl, 2-ethylhexyl, 2-butyldecyl, 2-ethyloctadecyl and 2,2-diethyldecyl. Thus, it can be seen that there can be either one of two substituents on the beta carbon atom and that the branched chain can be of any length provided the total number of carbon atoms in the R' groups falls within the defined limits.

In order to obtain the beneficial properties desired for the materials of this invention it is essential that the total number of carbon atoms in the defined silanes range from 30 to 50 inclusive. If the number of carbons is above or below these values, unsatisfactory lubricants are obtained. In the siloxanes of this invention, however, it has been found that the number of carbon atoms can range from 32 to 70 inclusive. The higher number of carbon atoms is permissible because the oxygen of the siloxane linkage sufficiently fluidizes the molecule so that a higher number of carbon atoms can be tolerated without rendering the material unsuitable for lubricants.

The compositions of this invention can be prepared by one of two basic methods. The first is that of reacting an alkylchlorosilane of the formula RSiCl₃, with an alcohol of the formula R'OH. In general, this reaction is best carried out by adding an excess of the alcohol to the chlorosilane, ordinarily at room temperature, and thereafter neutralizing the HCl with a mild base such as picoline or sodium bicarbonate. The crude product may then be distilled.

The disiloxanes employed herein can be prepared by modification of the above process which involves adding two mols of the alcohol to one mol of the chlorosilane thereby giving an alkoxychlorosilane of the formula R(R'O)₂SiCl 

The alkoxychlorosilane is then hydrolyzed using the theoretical quantity of water necessary to hydrolyze the chlorine. The hydrolysis is best carried out in the presence of a suitable HCl acceptor such as alpha-picoline, pyridine or the like. The resulting product is then treated with sodium bicarbonate or other mild base, filtered and distilled to obtain the disiloxane.

The second general method for preparing the silanes of this invention involves the reaction of an alkoxysilane of the formula (R'O)₃SiH with an olefin having the same number of carbon atoms as the desired R group. This reaction is best carried out in the presence of a platinum catalyst such as chloroplatinic acid and generally proceeds at temperatures from 80 to 150° C. at atmospheric pressure. After the reaction is complete the product may be distilled.

The products of this invention are useful as lubricants over the range from −100° F. to 500° F. for short periods of time and for prolonged periods of time at temperature ranges from −65° F. to +450° F. They have superior antiwear properties with respect to both organosiloxanes and silicates. The temperature-viscosity slope, oxidation resistance and hydrolytic stability are satisfactory for use as high temperature lubricants. They are more stable hydrolytically than the silicates.

The combination of properties found in the compositions of this invention make them highly useful for lubricants in general and particularly for use as hydraulic fluids which require a combination of lubricity, thermal stability, temperature-viscosity stability and oxidation resistance. For use as hydraulic fluids it is often desirable to employ additives to the compositions of this invention which will improve specific properties or stabilize the compositions against oxidation or aid in prevention of corrosion with respect to certain metals.

For example, it is often desirable to add an organic ester such as octyl sebacate, or 2-ethylhexyl sebacate in order to cause some swelling of the rubber connections and seals in the hydraulic system. This swelling action prevents leakage and is often desirable. In addition it is often desirable to add compatible organosiloxanes such as high viscosity ethylmethylsiloxanes as shown in U.S. Patent 2,746,926. The use of these ethylmethylsiloxanes gives even better temperature-viscosity behavior than the compositions of this invention alone.

Other additives which are often desirable are oxidation inhibitors, corrosion inhibitors and snuffers to reduce inflammability. It is to be understood that any of the above additives can be employed in the lubricants of this invention without departing from the scope thereof.

The following examples are illustrative only and should not be construed as limiting the invention which is properly set forth in the appended claims.

EXAMPLE 1

2-ethylbutanol was added with stirring to dodecyltrichlorosilane in a 10% molar excess over that required to react with all of the chlorine. After addition was complete, the material was held at reduced pressure overnight, treated with a mixture of 20 ml. of alpha-picoline and 50 grams of sodium bicarbonate and then heated at 150° C. for 4.5 hours. The product was cooled and distilled to give tris-2-ethylbutoxydodecylsilane boiling point 198° C. at .03 mm. and $n_D^{25}$ 1.4410.

EXAMPLE 2

Employing the procedure of Example 1 the silane tris-2-ethylhexoxyoctadecylsilane was prepared having the following properties: boiling point 222° C. at .03 mm., $d_4^{25}$ 0.862 and $n_D^{25}$ 1.4488.

EXAMPLE 3

Employing the procedure of Example 1, the silane tris-2,2-dimethylpentoxydodecylsilane was prepared having the following properties: boiling point 199° C. at .01 mm., $d_4^{25}$ 0.859, $n_D^{25}$ 1.4402.

EXAMPLE 4

2-ethylhexylalcohol was added to trichlorosilane in a 10 ml. percent excess over that required to react with all of the chlorine. The evolved HCl was removed under vacuum and the product was distilled to give tri-2-ethylhexoxysilane having the following properties: boiling point 141° C. at .3 mm., $d_4^{25}$ 0.868 and $n_D^{25}$ 1.4342. This silane was reacted with an equimolar amount of dodecene in the presence of 0.0002% by weight platinum added as chloroplatinic acid at a temperature of from 100 to 110° C. at atmospheric pressure. The product was distilled to give a 94% yield of tris-2-ethylhexoxydodecylsilane having the following properties: boiling point 190° C. at .07 mm., $d_4^{25}$ 0.863 and $n_D^{25}$ 1.4442.

EXAMPLE 5

35.9 mols of 2-ethylbutanol were added with stirring to 17.1 mols of octyltrichlorosilane. The evolved hydrogen chloride was removed under an aspirator with heating. The residue was essentially octyl(bis-2-ethylbutoxy)chlorosilane. This material was mixed with the theoretical amount of water in the presence of sufficient alpha-picoline to remove the HCl. The product was separated from the picoline hydrochloride and heated with 25 g. of sodium bicarbonate at 150° C. for 3 hours. The material was then distilled and there was obtained the compound bis-octyl-tetra-2-ethylbutoxydisiloxane having the properties: boiling point 214° C. at .4 mm., $d_4^{25}$ 0.889, and $n_D^{25}$ 1.4408.

EXAMPLE 6

Employing the procedure of Example 5 the disiloxane bis-dodecyltetra-2-ethylbutoxydisiloxane was obtained having the following properties: boiling point 252° C. at .1 mm., $d_4^{25}$ 0.889, $n_D^{25}$ 1.4476. This compound is a good lubricant for steel on steel.

EXAMPLE 7

Employing the procedure of Example 5 the disiloxane bis-dodecyltetra-2-ethylhexoxydisiloxane was obtained.

EXAMPLE 8

When sec-octyl(bis-2-ethylbutoxy)chlorosilane is reacted with a 10 mol percent excess of 2-octyl-1-dodecanol in the procedure of Example 1, the compound sec-octyl (bis-2-ethylbutoxy)(2-octyl-1-dodecanoxy)silane is obtained. This silane is a good lubricant for steel on steel.

EXAMPLE 9

The compositions shown below were tested for lubricity and hydrolytic stability and the results are shown in the tables below.

The materials were tested on the Shell four-ball wear tester as shown in Table I. In this test a ½ inch steel ball is rotated against three stationary ½ inch steel balls for 2 hours at a rate of 1200 r.p.m. under the loads and temperature conditions shown. The rotating ball wears a circular scar on each stationary ball. An average of the diameter of the three scars is taken as the "scar diameter" and is a measure of the amount of wear which has taken place. The larger the scar the poorer the lubricating properties of the lubricant.

The oscillating Falex machine tests in Table II were run in accordance with the description shown in column 4 of U.S. Patent 2,599,984 except that the shaft was oscillated between the V-blocks instead of being rotated.

The high temperature hydrolytic stability in Table III was obtained by placing a weighed amount of the organosilicon compound in a flame ignition 22 ml. Parr peroxide bomb together with a sheet of copper 1/32 inch thick and 1.5 sq. cm. in area and 6 volume percent water based on the amount of silane. The mixture is then heated at 400° F. for 20 hours. The percent by weight solid precipitate based on the weight of the silane, which is formed during the heating, is taken as a measure of the stability. The greater the amount of solid the greater the extent of hydrolysis.

*Table I*

| Organosilicon compound | Scar diameter in mm. at 275° F. under a load of— | | | Scar diameter in mm. at 400° F. under a load of 10 kg. |
| --- | --- | --- | --- | --- |
|  | 4 kg. | 10 kg. | 40 kg. |  |
| tris-2-ethylbutoxydodecylsilane | 0.37 | 0.56 | 0.98 | 0.51 |
| tris-2-ethylhexoxydodecylsilane | 0.30 | 0.40 | 0.88 | 0.48 |
| tris-2-ethylhexoxyoctadecylsilane | 0.33 | 0.40 | 0.69 | ---- |
| tris-2,2-dimethylpentoxydodecylsilane | 0.33 | 0.56 | 0.94 | ---- |
| bis-octyltetra-2-ethylbutoxydisiloxane | 0.42 | 0.71 | 0.89 | ---- |
| bis-dodecyltetra-2-ethylhexoxydisiloxane | 0.37 | 0.52 | 1.08 | 0.54 |

Table II

| Organosilicon compound | Teeth wear in 30 min. at 300 lb. load |
|---|---|
| $(2\text{-ethylbutoxy})_3SiC_{12}H_{25}$ | 6 |
| $(2\text{-ethylhexoxy})_3SiC_{18}H_{37}$ | 4 |
| $[(2\text{-ethylhexoxy})_2C_{12}H_{25}Si]_2O$ | 5 |

Table III

| Organosilicon compound | Wt. percent solids based on wt. of organosilicon compound |
|---|---|
| $(2\text{-ethylbutoxy})_3SiC_{12}H_{25}$ | 0.01 |
| $(2\text{-ethylhexoxy})_3SiC_{12}H_{25}$ | 0.035 |
| $[(2\text{-ethylhexoxy})_2C_{12}H_{25}Si]_2O$ | 0.07 |

That which is claimed is:

1. An organosilicon compound selected from the group consisting of silanes of the formula $RSi(OR')_3$ and disiloxanes of the formula $[R(R'O)_2Si]_2O$ in which R is an alkyl group of from 8 to 20 carbon atoms inclusive and R' is a branched alkyl group of from 4 to 20 carbon atoms inclusive in which the branching occurs at the carbon atom beta to the oxygen, in said silanes there being a total of from 30 to 50 inclusive carbon atoms per molecule and in said siloxanes there being a total of from 32 to 70 inclusive carbon atoms per molecule.

2. As a composition of matter tris-2-ethylbutoxydodecylsilane.

3. As a composition of matter tris-2-ethylhexoxydodecylsilane.

4. As a composition of matter tris-2-ethylhexoxyoctadecylsilane.

5. As a composition of matter tris-2,2-dimethylpentoxydodecylsilane.

6. As a composition of matter bis-octyltetra-2-ethylbutoxydisiloxane.

7. As a lubricant, an organosilicon compound selected from the group consisting of silanes of the formula $RSi(OR')_3$ and disiloxanes of the formula $[R(R'O)_2Si]_2O$ in which R is an alkyl group of from 8 to 20 carbon atoms inclusive and R' is a branched alkyl group of from 4 to 20 carbon atoms inclusive in which the branching occurs at the carbon atom beta to the oxygen, in said silanes there being a total of from 30 to 50 inclusive carbon atoms per molecule and in said siloxanes there being a total of from 32 to 70 inclusive carbon atoms per molecule.

References Cited in the file of this patent
UNITED STATES PATENTS

| | | |
|---|---|---|
| 2,624,749 | Bunnell | Jan. 6, 1953 |
| 2,643,263 | Morgan | June 23, 1953 |
| 2,701,803 | Orkin | Feb. 8, 1955 |

UNITED STATES PATENT OFFICE
CERTIFICATE OF CORRECTION

Patent No. 2,947,772            August 2, 1960

Benjamin A. Eynon et al.

It is hereby certified that error appears in the printed specification of the above numbered patent requiring correction and that the said Letters Patent should read as corrected below.

Column 2, line 14, for "one of two" read -- one or two --.

Signed and sealed this 3rd day of January 1961.

(SEAL)
Attest:
KARL H. AXLINE
Attesting Officer

ROBERT C. WATSON
Commissioner of Patents